United States Patent
Guggino et al.

(10) Patent No.: US 10,760,229 B2
(45) Date of Patent: Sep. 1, 2020

(54) TILT SENSING AND INDICATING DEVICE FOR A CONTAINMENT PLOW

(71) Applicant: Pro-Tech Manufacturing and Distribution, Inc., Rochester, NY (US)

(72) Inventors: Michael J. Guggino, Bloomfield, NY (US); Robert M. Wansea, Rochester, NY (US); Paul E. Spencer, Livonia, NY (US)

(73) Assignee: Pro-Tech Manufacturing and Distribution, Inc., Rochester, NY (US)

( * ) Notice: Subject to any disclaimer, the term of this patent is extended or adjusted under 35 U.S.C. 154(b) by 268 days.

(21) Appl. No.: 15/468,845

(22) Filed: Mar. 24, 2017

(65) Prior Publication Data

US 2017/0292237 A1 Oct. 12, 2017

Related U.S. Application Data

(60) Provisional application No. 62/313,799, filed on Mar. 27, 2016, provisional application No. 62/353,158, filed on Jun. 22, 2016.

(51) Int. Cl.
| | | |
|---|---|---|
| *E01H 5/06* | (2006.01) | |
| *G01C 9/12* | (2006.01) | |
| *G01C 9/06* | (2006.01) | |
| *H01H 35/02* | (2006.01) | |

(52) U.S. Cl.
CPC ............ *E01H 5/066* (2013.01); *G01C 9/06* (2013.01); *G01C 9/12* (2013.01); *E01H 5/061* (2013.01); *H01H 35/02* (2013.01)

(58) Field of Classification Search
CPC .......... E01H 5/066; E01H 5/061; G01C 9/06; G01C 9/12
See application file for complete search history.

(56) References Cited

U.S. PATENT DOCUMENTS

| | | | | |
|---|---|---|---|---|
| 2,782,525 A | * | 2/1957 | Eubank ................ | E02F 9/26 33/398 |
| 2,808,017 A | * | 10/1957 | Killebrew ............. | E02F 3/422 116/284 |
| 3,017,046 A | * | 1/1962 | Runci ................... | E02F 3/3411 116/297 |
| 3,154,160 A | * | 10/1964 | Roekwell ............. | G01G 19/083 177/141 |
| 3,462,845 A | * | 8/1969 | Matthews ............. | G01C 7/04 172/4.5 |
| 3,907,136 A | * | 9/1975 | Christides ............ | E02F 3/30 324/67 |
| 4,923,015 A | * | 5/1990 | Barsby ................. | E02F 3/845 172/4.5 |
| 5,327,345 A | * | 7/1994 | Nielsen ................ | E01C 19/006 172/4.5 |
| 5,450,909 A | * | 9/1995 | Stevenson ............ | E02F 3/842 172/430 |

(Continued)

OTHER PUBLICATIONS

Aervoe LED Raod Flare Kit Operating Instructions, Aervoe Industries Incorporated, Gardnerville, NV; 2 pages.

(Continued)

*Primary Examiner* — Jamie L McGowan
(74) *Attorney, Agent, or Firm* — Duane C. Basch; Basch & Nickerson LLP

(57) ABSTRACT

A tilt sensing and signaling device for a containment plow.

20 Claims, 13 Drawing Sheets

(56) References Cited

U.S. PATENT DOCUMENTS

| | | | | |
|---|---|---|---|---|
| 5,551,518 | A * | 9/1996 | Stratton | E02F 3/845 172/4.5 |
| 5,649,600 | A * | 7/1997 | Marsh | E02F 3/437 172/4.5 |
| 6,247,540 | B1 * | 6/2001 | Clemen | E02F 3/7613 172/430 |
| 6,655,465 | B2 * | 12/2003 | Carlson | E02F 3/847 172/4.5 |
| D510,289 | S | 10/2005 | Dueker et al. | |
| 7,088,222 | B1 | 8/2006 | Dueker et al. | |
| D560,533 | S | 1/2008 | Dueker et al. | |
| 7,430,983 | B2 * | 10/2008 | Hicok | E02F 3/431 116/313 |
| 7,677,017 | B2 * | 3/2010 | Holby | A01D 34/82 56/10.6 |
| 7,824,061 | B1 * | 11/2010 | Riedfort | F21S 6/002 362/183 |
| 7,921,997 | B2 * | 4/2011 | Burns | A45C 13/00 206/320 |
| 8,038,380 | B2 * | 10/2011 | Opperud | E02F 9/26 172/430 |
| D654,387 | S | 2/2012 | Wilson et al. | |
| D669,805 | S | 10/2012 | Edwards et al. | |
| 8,550,653 | B2 | 8/2013 | Wilson et al. | |
| D707,146 | S | 6/2014 | Bennett et al. | |
| 9,046,229 | B2 | 6/2015 | Bennett et al. | |
| 9,885,160 | B1 * | 2/2018 | Stone | E01H 5/065 |
| 2004/0121225 | A1 * | 6/2004 | Krieger | H01M 2/1005 429/96 |
| 2005/0016005 | A1 * | 1/2005 | Voecks | G01C 9/12 33/344 |
| 2008/0052929 | A1 * | 3/2008 | Paonessa | E01H 5/066 33/333 |
| 2008/0271329 | A1 * | 11/2008 | Voecks | G01C 9/12 33/345 |
| 2013/0212912 | A1 * | 8/2013 | Guggino | E01H 5/061 37/197 |

OTHER PUBLICATIONS

Yukihisa Sakai, Komatsu Technical Report; Development of Combined Automatic Blade Control for Snow-Removing Grader; 2002 vol. 48 No. 150; 6 pages.

* cited by examiner

TILT SENSING AND INDICATING DEVICE FOR A CONTAINMENT PLOW

This application claims the benefit under 35 U.S.C. § 119(e) from both U.S. Provisional Patent Application No. 62/313,799, for a CONTAINMENT PLOW WITH TILT SENSOR, by M. Guggino, filed Mar. 27, 2016, and U.S. Provisional Patent Application No. 62/353,158, for a CONTAINMENT PLOW WITH TILT SENSOR, by M. Guggino et al., filed Jun. 22, 2016, both provisional patent applications being hereby incorporated by reference in their entirety.

The disclosed embodiments are directed to a tilt sensing and indicating device, and a containment plow, or similar piece of equipment, having such a sensing device to at least visually indicate when the containment plow is in a level and/or an un-level condition.

BACKGROUND AND SUMMARY

In various containment plows, such as snow pushers sold by Pro-Tech Manufacturing (e.g., U.S. Pat. Nos. 5,724,755, 6,112,438), the sides of the plow are supported on replaceable wear shoes or similar sacrificial skid members. In certain plowing conditions it is difficult to assess when the plow is in a position and the wear shoes are parallel or level with the ground surface. Moreover, operators often tend to tilt the containment plow so as to drive the force of the plow disproportionately on the front or rear portions of the wear shoes and thereby increase the rate of wear of such shoes. As a result, not only do the wear shoes suffer shorter life, but there is also risk of damaging the containment plow, and of doing a poor job of removing snow or debris. For example, if the operator has the plow tilted forward, the rear of the plow may be slightly lifted off the surface being plowed, resulting in a loss of contact between the plow's scraping edge and the surface being cleaned.

One system for indicating the orientation of a containment plow involves placing a bar extending vertically upward from the plow (usually at the front or back if the side plate, and then attaching another freely pivoting bar or tilt indicator at the top of the vertical bar. An example of such a device is depicted, for example, in US 2008/0052929 A1. When the plow is not level, the freely pivoting bar may be seen to swing away from the vertical bar to indicate the tilted orientation. However, several problems exist with such mechanical tilt indicators. First, the extending bar, pivot point and tilt indicator are subject to damage (e.g., bending, breakage), as well as, accumulation of snow and ice, which prevent them from being responsive or accurately indicating a tilted orientation. Second, even if properly functioning, the indicators are typically attached or mounted at or near a side of the plow and are not only difficult to see, but are also prone to swinging as a pendulum in response to a change in momentum of the plow and loader as much as they are to responding to an actual change in the tilt or orientation of the containment plow.

Accordingly, the disclosed embodiments are intended for use on any type of containment plow, including those designed for snow and debris removal, and also including different designs of such plows. For example, in addition to the snow pushers noted above that are manufactured and sold by Pro-Tech and others, the disclosed embodiments may also be suitable for use on turf-clearing equipment, both artificial and natural turf—for example, see TURF PLOW Design Patent, U.S. D680,558; Apr. 23, 2013, by Matthew Clement. Thus, the disclosed tilt sensor and signaling device finds practical application wherever it is important to keep the ground or turf contacting surfaces of the plow fully engaged with the surface so as to avoid excessive force at any one point—forces that could result in excessive wear, damage, as well as tearing or other damage to a surface being cleaned of snow or debris. Of course, it will be further appreciated that the disclosed tilt sensing and indicating system may have practical application for plows and other types of devices, other than containment plows, particularly devices that perform optimally when maintained at a particular angle with respect to a surface over which they are being used.

Disclosed in embodiments herein is a tilt sensing and indicating device for attachment to a containment plow, including: a sensor, attached to the containment plow, for detecting the angular orientation of the containment plow about a longitudinal axis of the containment plow in a home (level) position as well as when the device is in an orientation that deviates more than a pre-defined angle (N degrees) from the home position; and at least one light, responsive to said sensor, wherein a state of the at least one light changes when the sensor signals that the device is in an orientation that deviates more than a pre-defined angle (e.g., N degrees) from the home position.

Also disclosed herein is a system for monitoring the tilt of a containment plow apparatus comprising: a containment plow, including an upstanding central blade, having a longitudinal edge along a bottom side of said blade, and at least one side plate attached to and extending generally forward from the central blade near an end thereof; a plow tilt sensing device operatively attached to a surface of the containment plow for monitoring a relative tilt angle of the plow about a longitudinal axis thereof, said tilt sensing device producing a visual signal representing the relative tilt angle of the containment plow; a visual indicator on the tilt sensing device for providing an output in response to the relative tilt angle; and a processor for controlling the operation of the tilt sensing device; said processor operating in accordance with a program stored in memory associated with said processor, to periodically determine the relative tilt angle and to update the output signal and visual indicator in response thereto, where a representation of the output signal is provided by the visual indicator.

Figure 1:
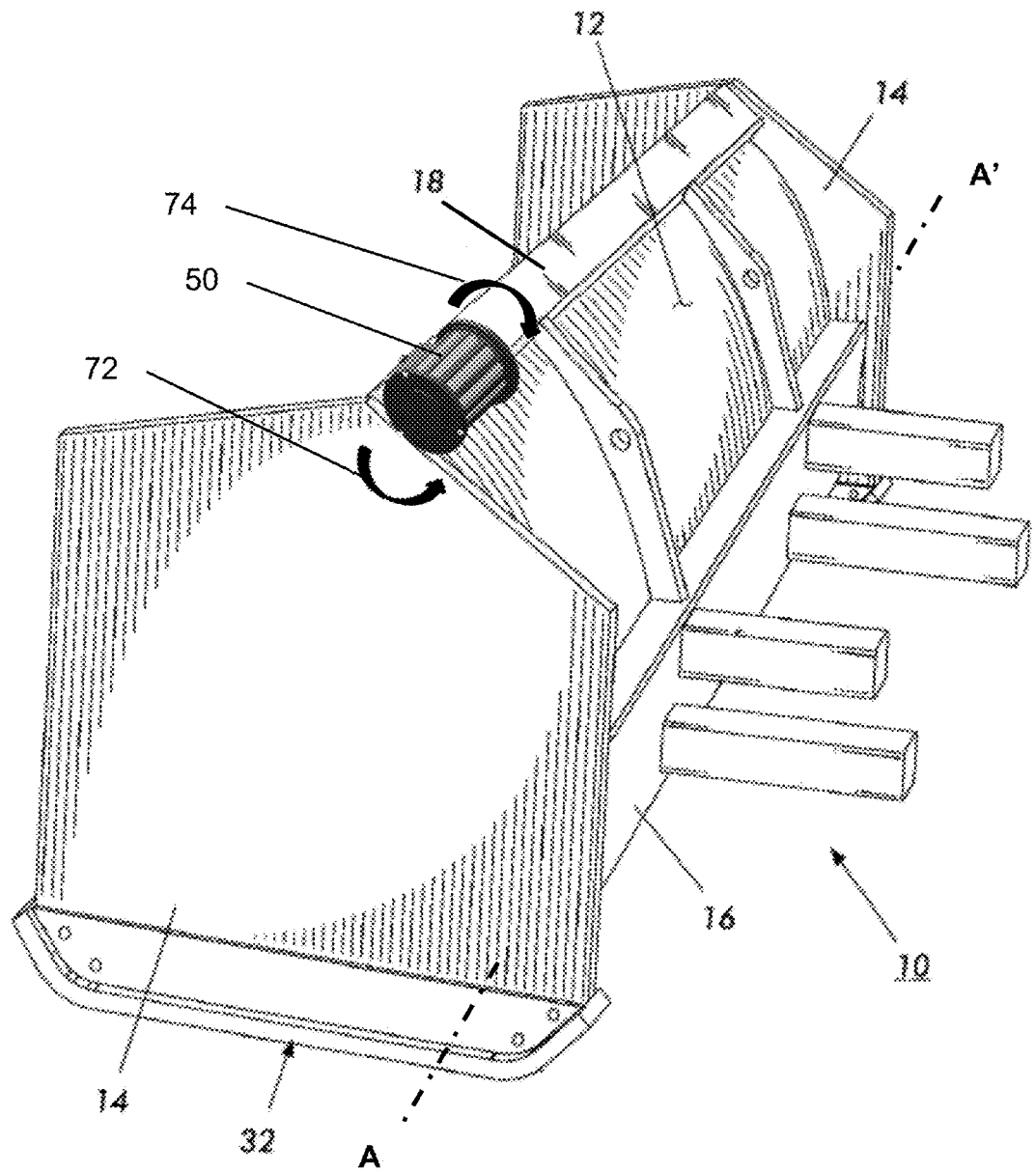
FIG. 1 is a perspective view of an embodiment of the tilt sensing and indicating (beacon) device attached to a containment plow.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Referring to the figures, in the drawings, reference numerals have been used throughout to designate identical elements. In describing the embodiments, the following term(s) may have been used in the description. A "surface" refers to any surface such as a roadway, turf, driveway, parking lot, runway, feed lot or the like where a containment plow is to be used. Such surfaces are generally flat areas that do not have significant bumps or barriers extending upward and above the surrounding region.

In FIG. 1, one embodiment of a containment plow or pusher 10 includes an upstanding steel blade 12 constructed of steel plate, and a vertical side plate 14 at each end of the blade 10. The side plates 14 extend generally in a forward direction from the blade. The rear or back side of the blade 10 includes one or more horizontal reinforcing channels 16 and 18 welded across the longitudinal width of the blade 12. Longitudinal channels 16 and 18 are both U- or C-shaped rectangular channel, welded along their entire lengths to the blade 12. A sacrificial wear shoe or skid member 32 is attached along the bottom of the side plate 14. A mounting or attachment feature, such as the posts depicted, are attached to the rear of the pusher to permit the coupling of a loader or similar vehicle for movement and use of the pusher.

Also depicted in FIG. 1 is a tilt sensing and indicating device 50 attached to the pusher along the top channel. As used herein the term "beacon" may be used to generally describe the tilt sensing and indicating device 50 that is affixed or attached to the pusher 10. It will be appreciated that the position of the tilt sensing and indicating device 50 may be done at any convenient location on the rear of the pusher or blade at a position where the device is visible to an operator from the cab of the loader. Furthermore, to facilitate the application of the beacon 50 at various locations on the plow, the device includes light-emitting portions as further described below, which can be seen from a range of positions about the device 50. For example, the range of position may extend over a range of up to 180-degrees, or up to 240-degrees or more as will be appreciated from a review of the embodiments in FIGS. 3, 4B, 6A-C, 11A-11B, 12, etc. Also depicted is a longitudinal axis A-A' that extend parallel to the blade of the containment plow 10.

Figure 2:
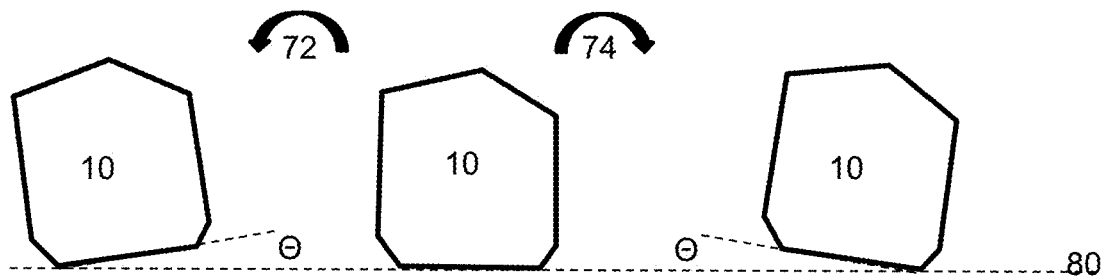
FIG. 2 is an illustration of different tilt angles or orientations of a side view of the containment plow in FIG. 1.

Referring next to FIG. 2, depicted therein are three illustrations of a side view of the containment plow 10 in FIG. 1. In the center view, the containment plow is flat or horizontal on surface 80. In the leftmost illustration of FIG. 2, the containment plow is shown as tilted or rotated in the direction of arrow 72 about the longitudinal axis in a + $\Theta$-degree angle. And, in the rightmost illustration of FIG. 2, the containment plow is shown as tilted or rotated in the direction of arrow 74 about the longitudinal axis in a − $\Theta$-degree angle. In the disclosed embodiments, the angle of tilt about the longitudinal axis of the containment plow is sensed so as to provide an indication when the angle has exceeded a pre-defined limit of 2-5 degrees, and in one embodiment a tilt angle of about 3-degrees is used as the limit as will be more specifically described below.

Figure 3:
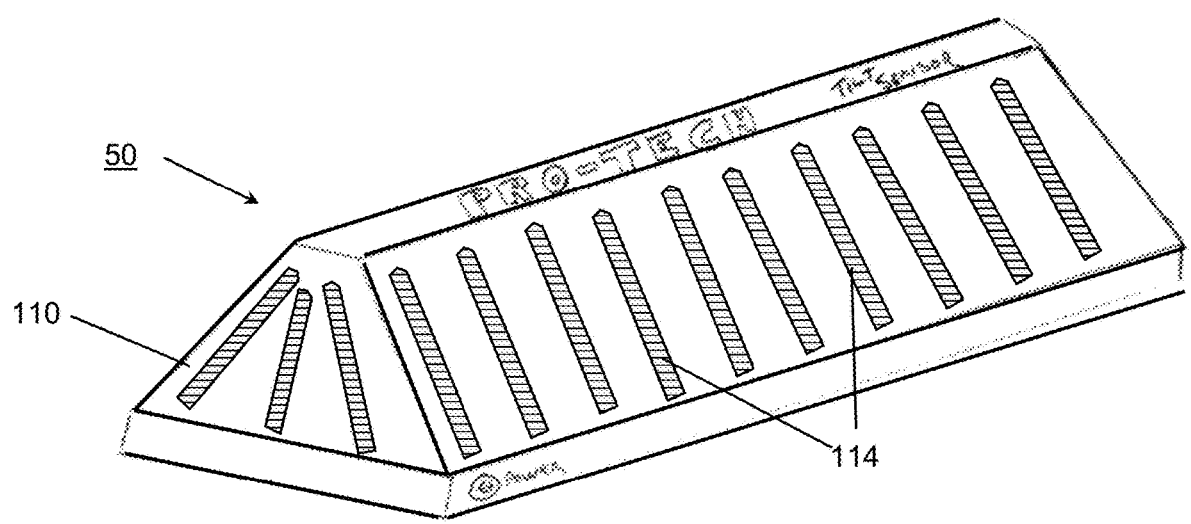
FIGS. 3-5 are illustrations of features of alternative embodiments for the tilt sensing and indicating device as disclosed herein.
Figure 4A:
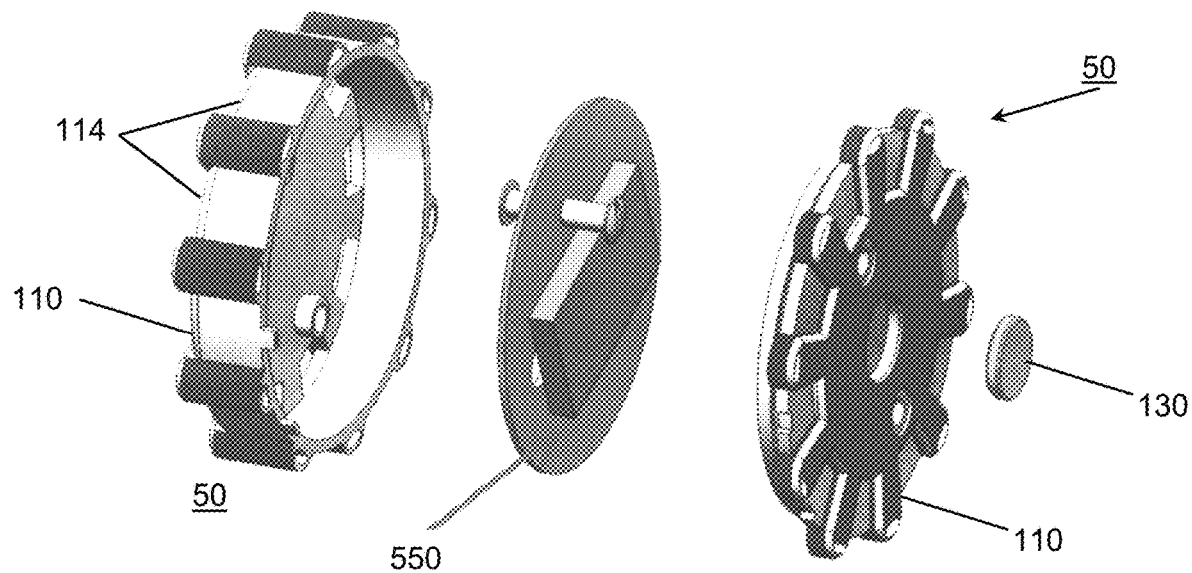
Figure 4B:
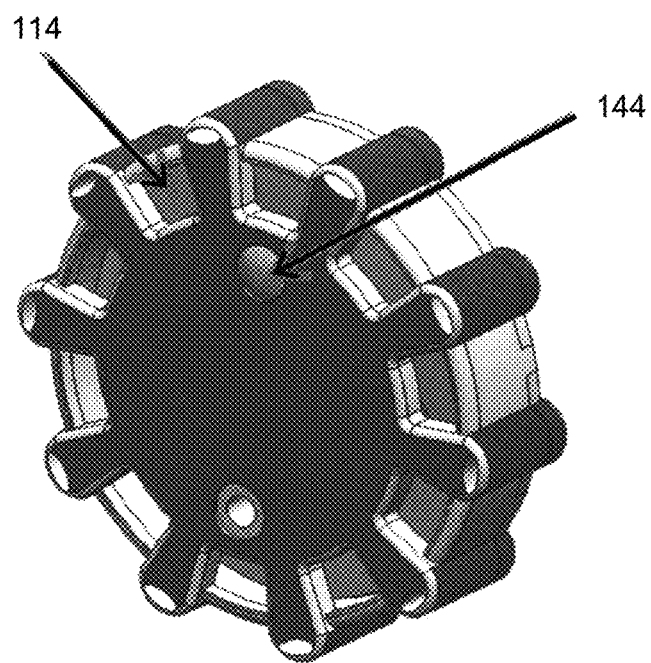
Figure 5:
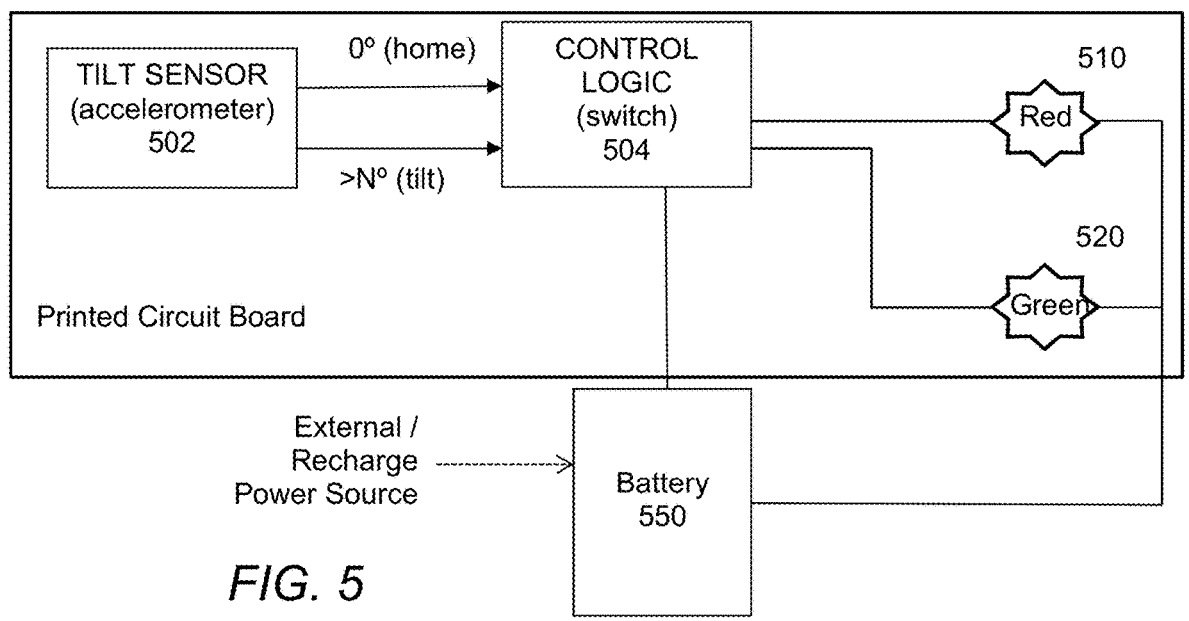
Figure 6A:
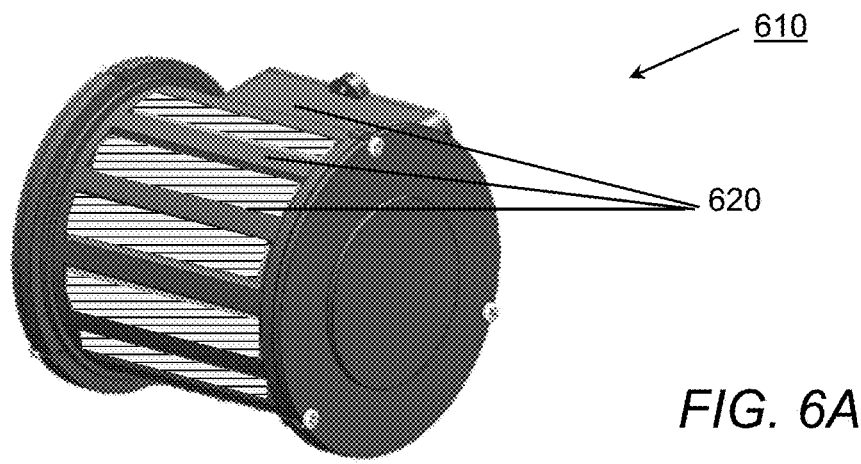
FIGS. 6A-6C are illustrations of an alternative embodiment for the tilt sensing device.
Figure 6B:
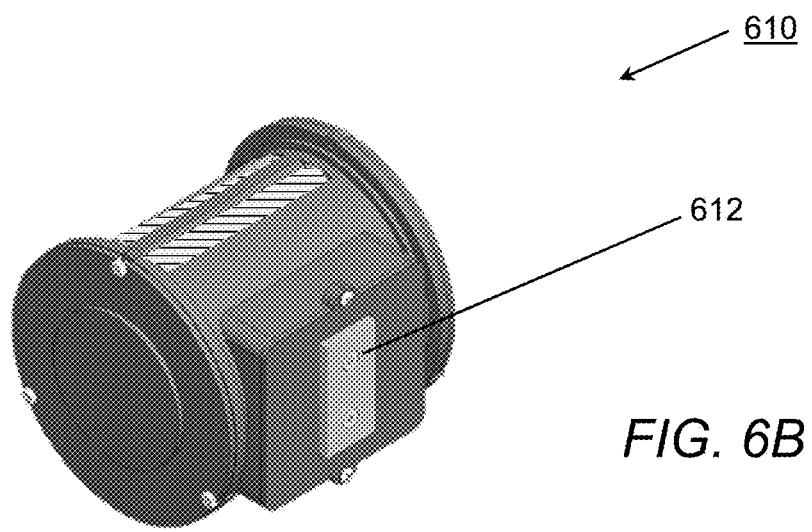
Figure 6C:
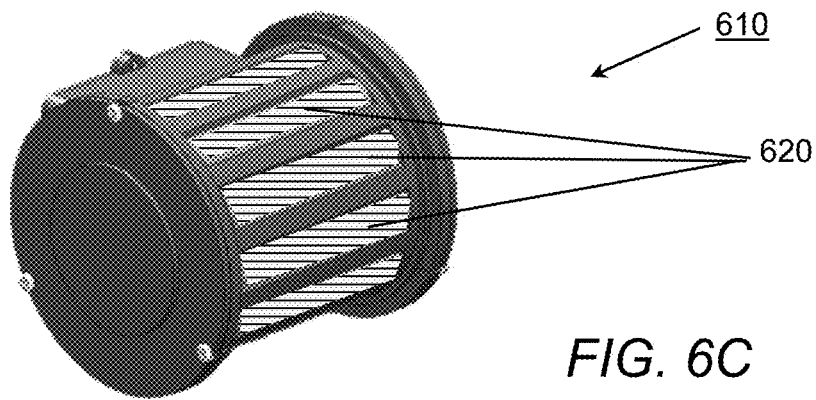
Figure 7:
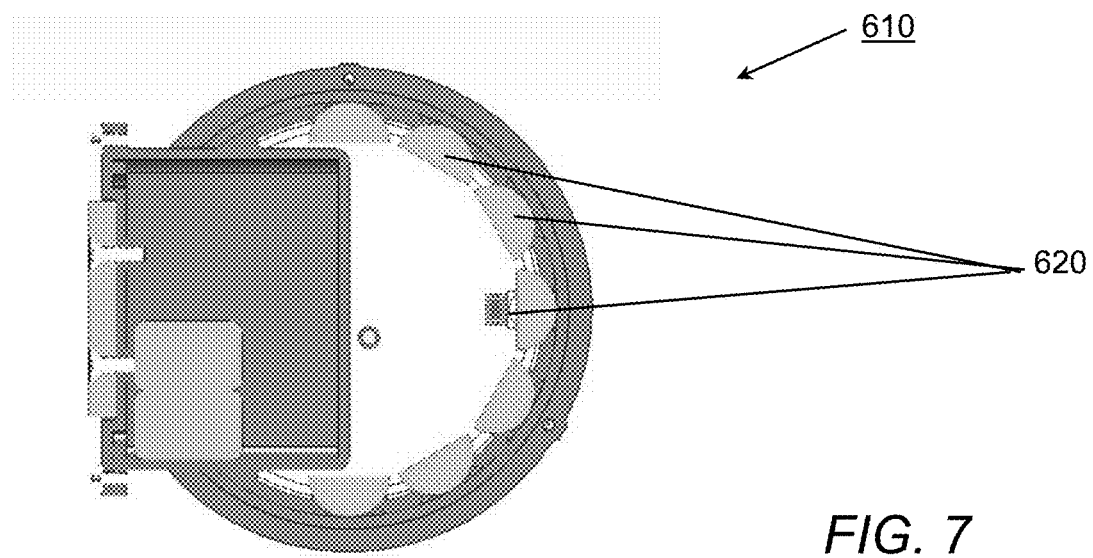
FIG. 7 is a cutaway view of the sensor embodiment in FIGS. 6A-6C.

Having generally described an embodiment in which the tilt sensing and indicating device 50 may be employed, attention is now turned to several alternative embodiments of the device as illustrated in FIGS. 3-5. As noted the device is intended to be removably attached to a containment plow or similar apparatus for collecting or moving snow, debris and the like. The device generally includes a sensor 502, for detecting the angular orientation of the containment plow about a longitudinal axis of the containment plow in a first or home (level) position, as well as when the device is in an orientation. In the event that the sensor determines that the containment plow has deviated more than a pre-defined angle of N degrees from the home position, control logic 504 associated with the sensor will in turn control the state of lights 510 and/or 520 to indicate that the device has been tilted by a visual indicator.

In one embodiment, sensor 502 may be a conventional accelerometer, such as those made by Dimension Engineering, a micro-electromechanical device used to measure changes in proper acceleration, whereby measurement of acceleration can be output by the sensor as a proportional signal indicative of the tilt or rotation about the longitudinal axis. Moreover, the accelerometer may be of any type, including: piezoelectric, strain gauge, magnetic field, optical, electromechanical servo, capacitive, or any other type commonly used. In essence, any sensor suitable for providing a real-time output that is indicative of the orientation of the containment plow about its longitudinal axis A-A' may be suitable for use as a sensor to provide input to the control system, including both analog or digital sensors.

Although various system designs may be employed with respect to the sensor, such a device is generally referred to as an accelerometer or inclinometer (or clinometer), and produces an output that characterizes the angle that the device senses. The accelerometer, located in the beacon tilt sensing and indicating device 50 and reference device 640 units may be affected by forces produced when the respective pusher and vehicle are subject to abrupt movements and changes in direction. Accordingly, smoothing of the accelerometer output, for example using an analog or digital filter(s), may be necessary to minimize the effects of vibration and rough terrain. For example, the signals may be stored and time-averaged, time-smoothed or low-pass filtered or otherwise processed to assure that the signals used by the respective devices are truly representative of the equipment angle and not simply an intermittent aberration. While the electronic system can be analog or digital, a digital system is believed preferable as it can be self-calibrating and may eliminate manual tuning that an analog system often requires.

As also illustrated in FIG. 5, for example, the visual indicator may be one or more lights (e.g., light-emitting diodes or LEDs) associated with the device. As depicted, a red LED 510 may be used to indicate a tilt orientation of greater than a pre-defined limit N. For example, the red LED 510 may be illuminated at >+/−3-degrees, and a green LED 520 may be used to indicate an acceptable or level orientation that does not exceed the +/−3-degree limit. Thus, the LEDs are lights to provide a visual indication, in response to the sensor, where the state (color) of the light changes in response to the sensor signaling that the device is in an orientation that deviates more than a pre-defined angle (N degrees) from the home position (e.g., level condition in center of FIG. 2).

Although not specifically illustrated in the other figures, FIG. 5 contemplates an input such as a switch or contact that is provided to the tilt sensor 502 and/or the control logic 504 such that the tilt sensing and indicating device allows an operator to zero or "home" the device in order to calibrate it once affixed to the containment plow. This homing or zeroing feature facilitates the device being removed and stored (and also recharged) when not in use as well as sharing or swapping the device across multiple plows or pieces of equipment.

Referring to the embodiments of FIGS. 3-4, the device 50 includes a housing 110 with one or more apertures or lenses 114 that permit a light(s) to be illuminated inside the housing yet seen from outside. The housing may be of different shapes or configurations. The housing design parameters include: (i) all-weather (weather resistant) housing; (ii) magnetic attachment (e.g., heavy-duty permanent magnet 130); (iii) green light illuminated when level (home) orientation (0°); (iv) red light illuminated when tilted (>+/−3° tilt); (v) self-calibrating (homing at 0°); and (vi) a rechargeable battery (550).

As noted above, the use of a magnet to attach or affix the device 50 to a containment plow 10 permits the device to be removed when not in use or for recharging. The battery 550 used to power the device may be a replaceable battery or a rechargeable battery. In the event a rechargeable battery is used, the battery may be sealed within the housing 110 and recharging may be via external contacts 144 as illustrated, for example in FIG. 4B. Thus a rechargeable power source may be used to operate the sensor and associated logic as well as the lights. Preferably the rechargeable battery may be recharged using available power sources that may include AC or automotive power (e.g., 5V (USB), 12 VDC), and it is contemplated that the housing fits within a cradle or similar fixture whereby the contacts 144 are used to recharge the device.

In an alternative embodiment of the tilt sensor, referred to as the Sno Level™, the basic function of the device remains as disclosed above, but the device is improved both in its robustness and ability to accurately sense plow blade tilt, as well as in the ability to indicate a tilt condition. Referring to FIGS. 6A-10, the alternative embodiment will be described in detail. Moreover, while disclosed relative to a conventional containment plow, the tilt sensor 610 (Sno Level), may also be used with other plowing system, for example the material pusher and control system disclosed in U.S. Pat. No. 9,151,006 for a MATERIAL PUSHER WITH CONTROL SYSTEM to Guggino et al., which is hereby incorporated by reference in its entirety.

Referring to FIGS. 6A-10, depicted therein is a system 600 for monitoring the tilt of a containment plow or similar type apparatus, for example a Pro-Tech Sno Pusher 604. The tilt sensing system is intended to work on a containment plow 604, including an upstanding central blade, having a longitudinal edge along a bottom side of said blade, and at least one side plate attached to and extending generally forward from the central blade near an end thereof. The containment plow also may have a scraping edge attached along a bottom longitudinal edge of the central blade. As illustrated, for example, in FIG. 9A, the plow tilt sensing device 610 is designed to be operatively attached to a surface of the containment plow 604 for monitoring relative tilt angle of the plow (e.g., central blade). In one embodiment, the tilt sensor may be removably attached to the snow pusher by a permanent magnet 612, or another custom attachment mechanism. And, although the device may operate as a stand-alone unit, one embodiment contemplates the device being recharged in a cab-mounted charging cradle 640.

As with the earlier embodiment, the device of FIGS. 6A-10 produces a visual signal representing the relative tilt angle of the containment plow using an array including multiple LED strips 620. In one embodiment the sensor uses a mechanism (e.g., pendulum 626) to sense its orientation and thereby determine tilt. However, the relative tilt is, in one embodiment, a tilt that takes into account a prevailing orientation of the landscape. Determining the relative tilt angle is accomplished by employing a second tilt sensor, for example, one located in the charging cradle placed in the cab of the vehicle. In one embodiment the angle of tilt detected by the cab tilt sensor 642 located on the vehicle is subtracted from the angle of tilt detected by the plow tilt sensor 610, and the resulting tilt angle is the relative angle of the snow pusher.

For example, if a pusher is being used to clear a parking lot and is being pushed in parallel with (e.g. down) a 7-percent grade (~4-degree angle), then if the plow-mounted sensor detects an angle of 5-degrees, rather than signal a tilt angle of 5-degrees, the relative angle is only two degrees (plow oriented at 2-degrees relative to the ground).

While in active operation, the angle of tilt detected by the cab tilt sensor 642 located on the vehicle is periodically sent to the plow tilt sensor 610 (e.g., via a wireless communication channel such as Bluetooth), so that the plow tilt sensor can calculate the relative angle of tilt as described above, and the resulting tilt angle may then be used to visually signal the plow tilt orientation. In the embodiment depicted in FIGS. 6A-6C, a visual indicator on the tilt sensing device is provided by an LED array 620 that produces an output in response to the relative tilt angle. For example, a flashing green output could be displayed by LED array 620 when the relative tilt angle is in an acceptable range (e.g., +/−2-3 degrees), a first flashing red signal (sequentially lighting the LED about the sensor in a clockwise direction) when the relative angle exceeds the acceptable range in a positive direction, and a second flashing red signal (sequentially lighting the LED about the sensor in a counter-clockwise direction) when the relative angle exceeds the acceptable range in a positive direction. Of course, the color, pattern, sequencing, and various ranges for the visual signals may be programmed in accordance with the above or alternative configurations and may be controlled in accordance with programming instructions stored in the memory of the plow tilt sensor 610.

As will be appreciated; a processor 628 may be used for controlling the operation of the tilt sensing device(s). The processor operates in accordance with a program stored in memory 630 associated with the processor, and periodically determines the relative tilt angle in the manner described above. Each time the relative tilt angle is calculated, an update the output signal and visual indicator is made, where a representation of the output signal is provided by the visual indicator. Although described relative to an output signal from the LED array 620 of the plow tilt sensor, it is also conceivable that an in-cab display associated with the charging station could be provided as well, perhaps via LED's 650 shown thereon. Alternatively, or in conjunction, LEDs 650 are also available to show the charge status of the plow tilt sensor 610 when it is being recharged (e.g., one of the LEDs would be green when fully recharged). Also contemplated is the use of a relative tilt angle display in association with a control system such as that described in U.S. Pat. No. 9,151,006 for a MATERIAL PUSHER WITH CONTROL SYSTEM (previously incorporated herein by reference in its entirety), where the relative tilt of the plow angle could be determined as described herein and reported or displayed on the display panel of the control system disclosed in the patent.

Figure 8A:
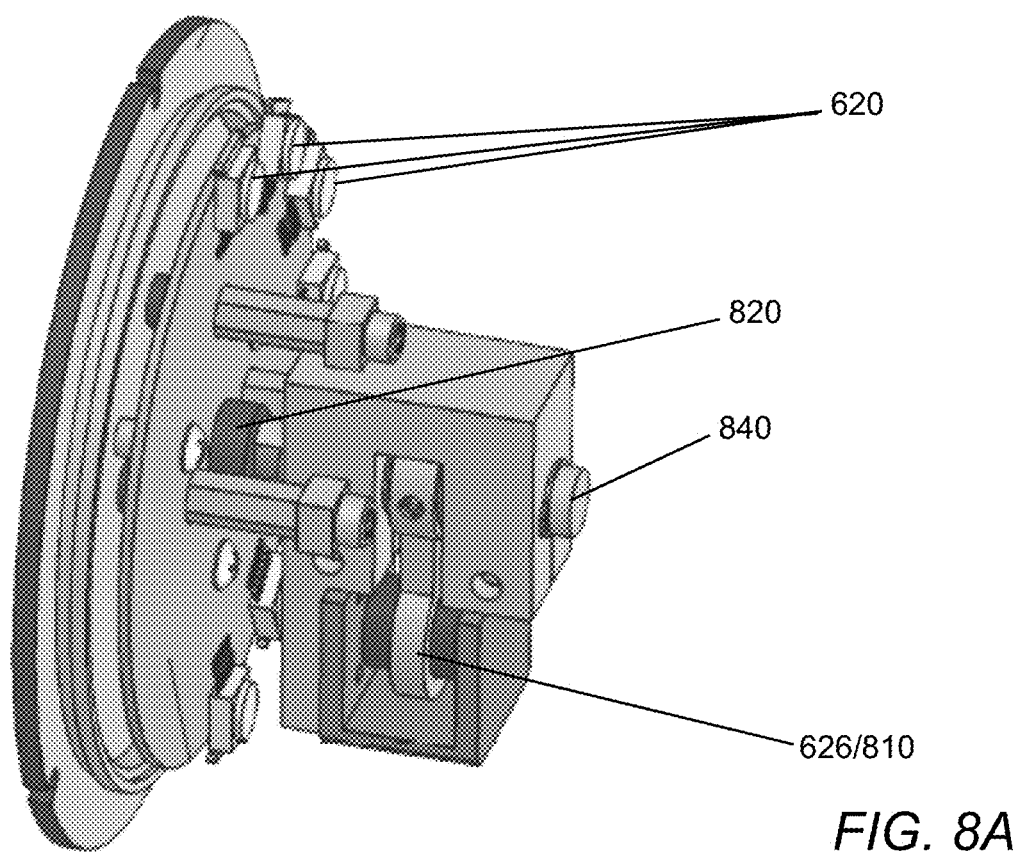
FIGS. 8A-8F are illustrations of the tilt-sensing pendulum and related components for us in the embodiment of FIGS. 6A-6C.
Figures 8B, 8C, 8D:
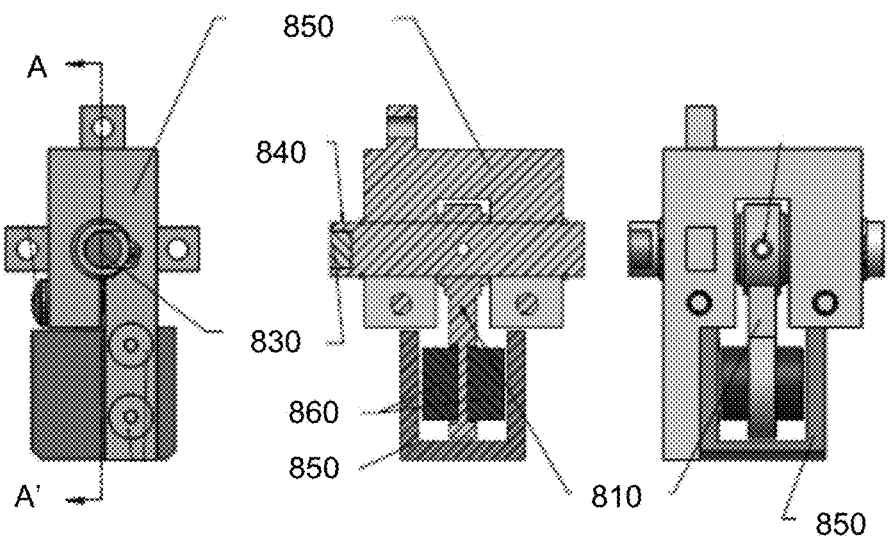
Figure 8E:
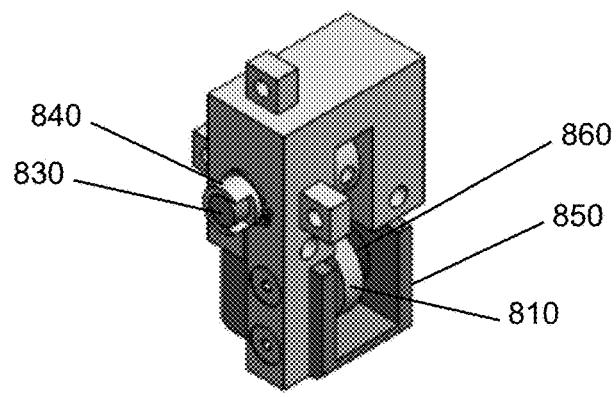
Figure 8F:
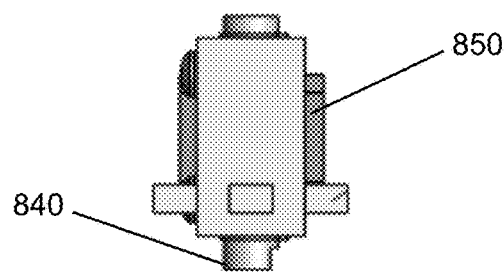
Figure 9A:
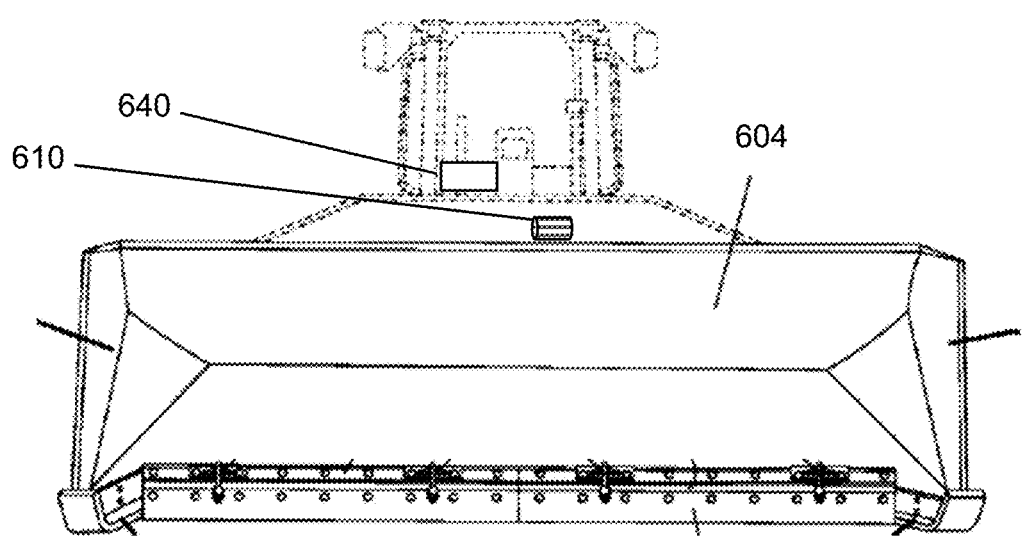
FIGS. 9A-9B are illustrations of an exemplary system both facing the vehicle with plow and from inside the vehicle cab, respectively.
Figure 9B:
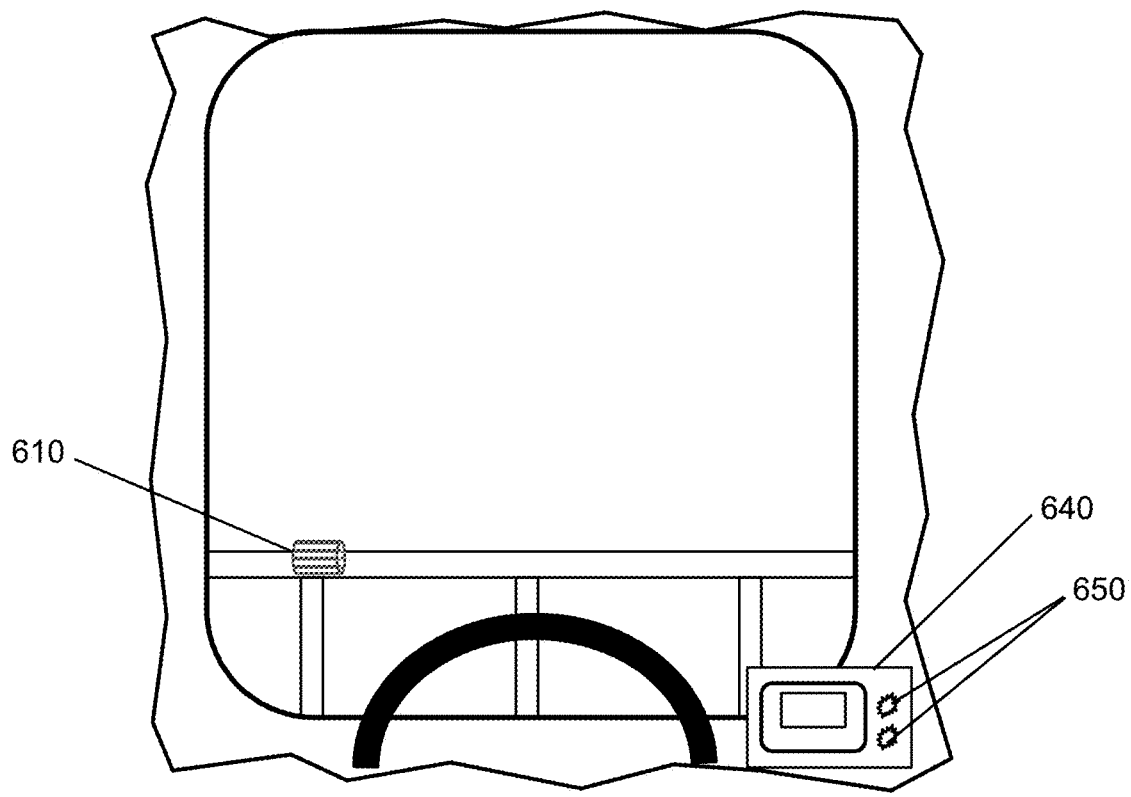

Referring to FIGS. 8A-8F, when a tilt sensing device (plow or charging cradle) is operatively attached to an equipment surface for which tilt is to be monitored (e.g., along the rear surface of a top channel of a snow pusher) the device may employ a mechanical pendulum 810 to subsequently monitor the angle of the equipment—the angle of the pendulum being monitored to determine the relative tilt angle. In one embodiment, the angle of the pendulum is sensed or monitored by a sensing device 820 that is responsive to the rotation of a permanent magnet 830 placed at the end of a rotatable shaft 840 that supports the pendulum. As illustrated in FIGS. 8C-8D, the pendulum 810 is at least partially enclosed by a housing 850 (pendulum brake) made of a material that dampens the movement of the free-swinging pendulum (a material to which the magnet is attracted). In one embodiment the pendulum and/or housing include permanent magnets 860 that tend to resist or dampen the pendulum's free-swing relative to the housing (brake) 850 in order to assure that the angle being sensed at any time is not merely the result of normal changes in movement of the equipment (e.g., inertia of starting, stopping, hitting packed snow/ice, etc.) In other words, the movement of the pendulum is dampened by at least one permanent magnet or a similar dampening material or configuration. As will be appreciated, similar pendulum sensors could be employed in both the plow tilt sensor 610 and the in-cab (charging cradle) tilt sensor 642, such that with communication between the two tilt sensing devices (e.g., from cab to plow), the relative tilt angle can be determined. Although it is possible for the system to be configured in various ways, the disclosed embodiment contemplates the vehicle tilt sensing device communicating the vehicle tilt angle (an approximation of the ground grade) to the plow tilt sensing device, and the plow tilt sensing device combining the two tilt signals to calculate the relative tilt angle and then provide a visual display to indicate whether the relative tilt angle is within or outside of a desired range. For example, the plow tilt sensing device and the vehicle tilt sensing device may be in wireless communication with one another (e.g., Bluetooth) to communicate the tilt angle signal detected by at least one of the sensing devices to the other.

It will also be appreciated that while the tilt sensors (plow beacon and in-cab reference units) may be generally placed in a "level" position, they will need to perform a calibration operation each time they are installed so that they can accurately sense the tilt angle of the respective equipment (plow and vehicle) to which they are attached. The calibration operation would simply detect and store, in memory, the offset angle determined as the difference between the respective angles sensed by each of the two units at the time of calibration, and then all subsequent measurements from that tilt sensor (until a new calibration), would reflect an adjustment for the offset angle.

Figure 11A:
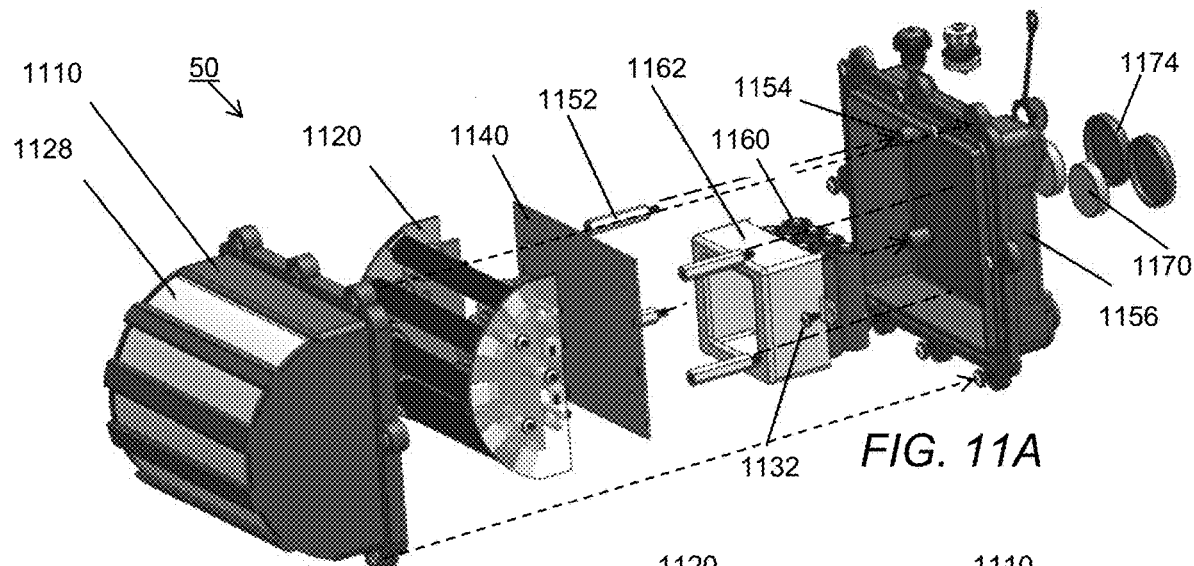
FIGS. 11A-11B, and 12 are assembly views of an alternative beacon unit for mounting on a plow.
Figure 11B:
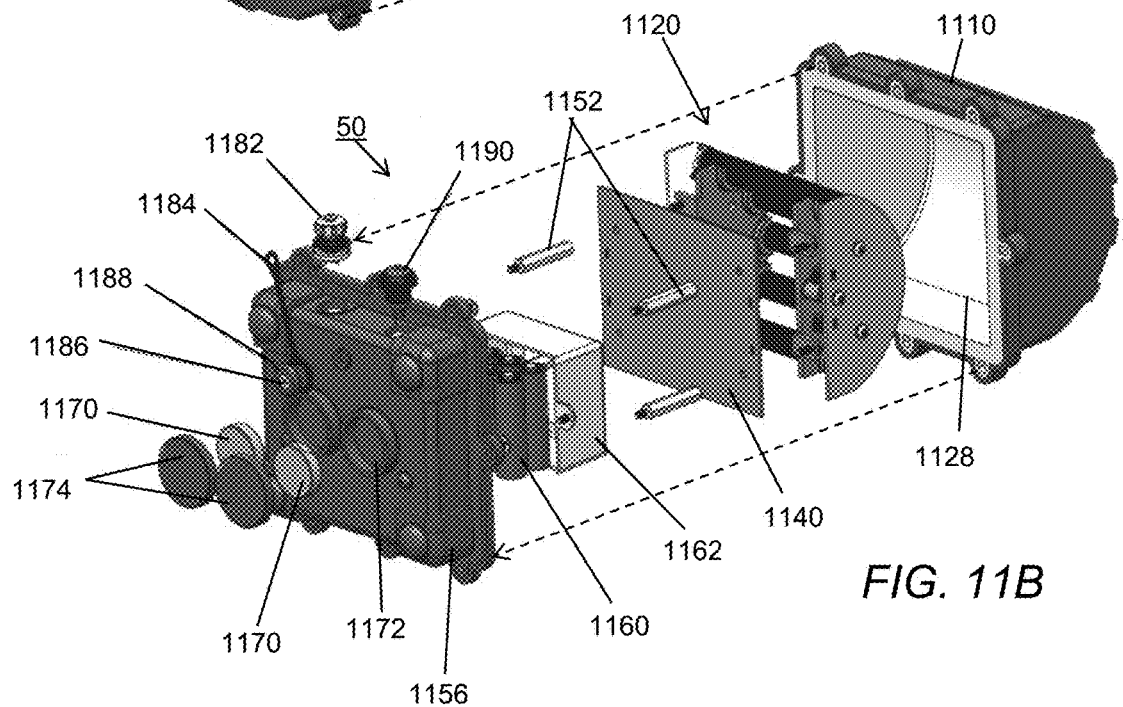
Figure 12:
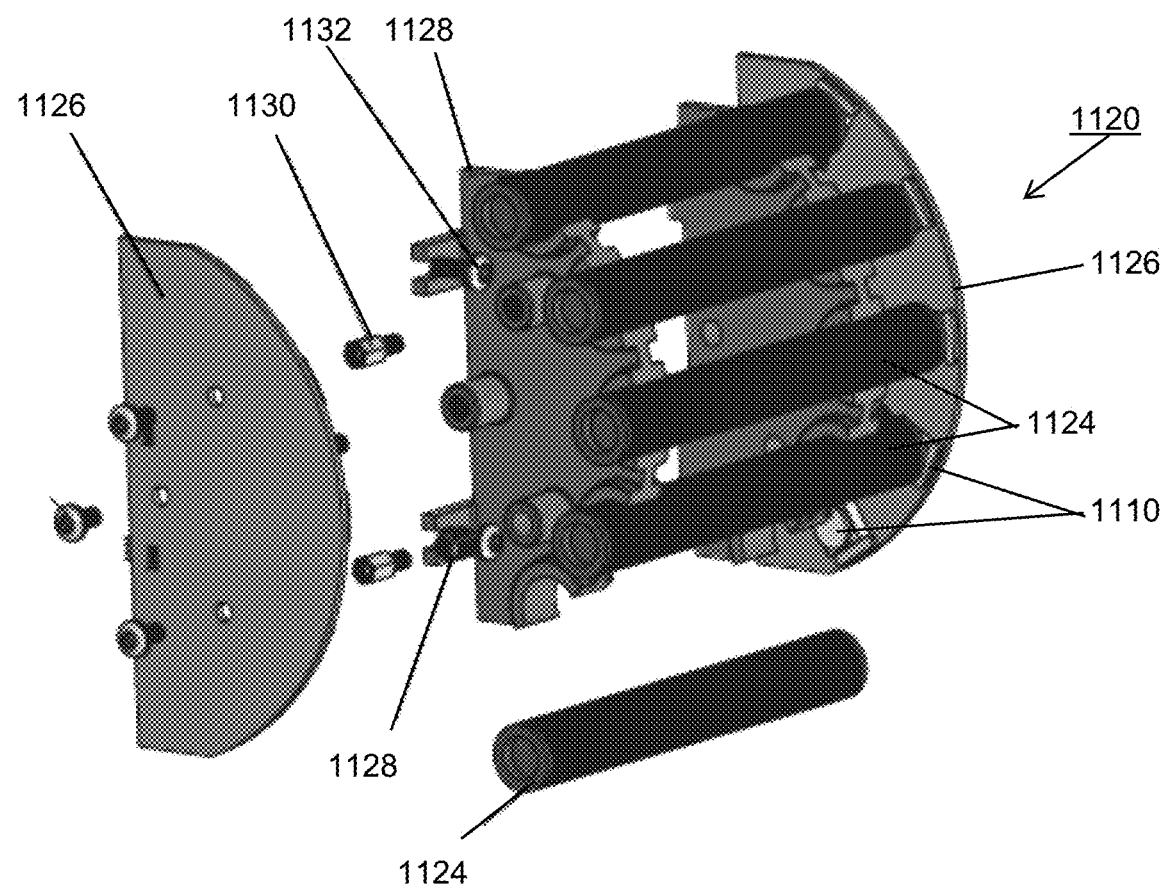
Figure 13:
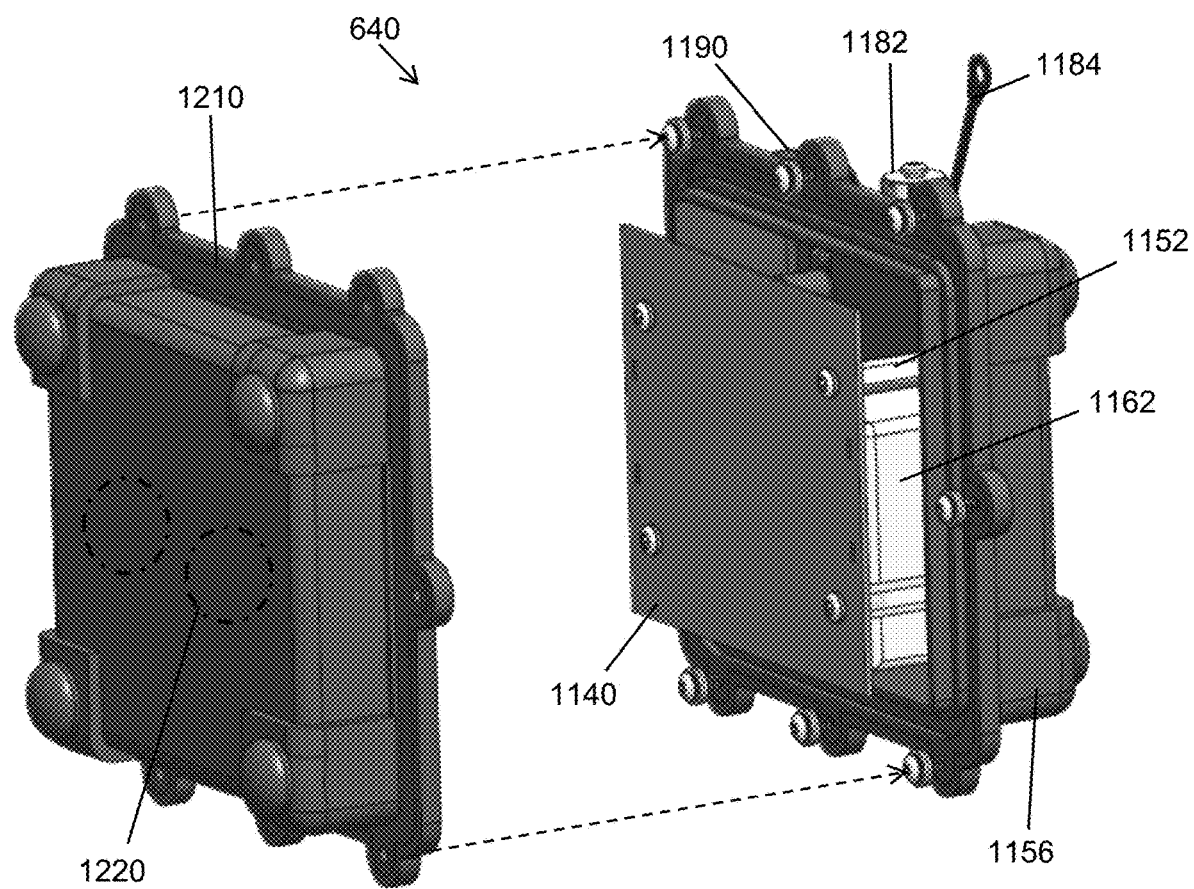
FIG. 13 is an alternative view of a reference unit for use within a cab of a vehicle.

Another alternative embodiment for the tilt sensing and indicating devices is illustrated in FIGS. 11A-13. More specifically an assembly view of a beacon unit 50 is depicted in FIGS. 11A-11B and 12, and an associated reference or cradle unit 640, for use in the cab, is depicted in FIG. 13.

Referring to FIGS. 11A-11B and 12, the beacon unit assembly 50 includes a front cover 1110. Under the front cover 1110 is a light pipe assembly 1120. Referring to FIG. 12, light pipe assembly 1120 includes a plurality of light-emitting diodes (LEDs) 1122 that are optically associated with light pipes 1124, which are supported by a pair of parallel end supports 1126 that hold the LEDs at the ends of the light pipes, and central supports 1128 that hold the mid-sections of the light pipes. The light pipes are made of a translucent material that serves to transfer and emanate the light from the LEDs to the surface of the light pipes, which is then projected through the surface of lenses 1128 in cover 1110. The end supports 1126 and central supports 1128 are both attached to and held in their respective positions by standoffs 1130 and screws 1132, which provide attachment of the light pipe assembly to printed circuit board 1140. Likewise, printed circuit board 1140 is attached to the rear cover 1150 using standoffs 1152 that screw into the receptacles 1154 in the rear cover 1156. Also enclosed within the front and rear covers of the beacon device is a source of power such as provided by rechargeable batteries 1160 located within battery holder 1162, which is electrically connected to the printed circuit board 1140 and serves to power the control circuitry on the printed circuit board and the associated LEDs.

Rear cover 1156 further includes a mounting feature, which in one embodiment includes at least two permanent magnets 1170 (e.g., 1.0"×0.25" Disc-Neodymium) enclosed within recesses 1172 on the outside of the rear cover and held therein by caps 1174. Also on the rear cover is a USB port (e.g., CONEC USB Receptacle) including a dustcap 1180, receptacle 1182, tether 1184, and anchor 1186, and anchor retainer 1188. Rear cover 1156 may further include an optional on/off switch 1190.

In an alternative embodiment, the beacon 50 does not employ an external switch 1190, but is activated by a software switch or feature in response to a "wake-up" signal produced and broadcast by the reference unit 640. In such a situation, the reference unit may employ a switch that, when placed in the "on" position, results in the generation of the "wake-up" signal and its transmission to the beacon 50. In this alternative embodiment, beacon 50 has at least a "sleep" mode in which primarily its receiver (Sensor Communications block in FIG. 10) is operational awaiting a "wake-up" signal, and an "operating" or active mode in which it is fully functional in response to a "wake-up" signal.

In yet another alternative embodiment, beacon 50 may further include or be operatively attached to a mounting tray or other mechanical feature that is mechanically attached to the plow or pusher. In such an embodiment, the beacon may still attach to the mounting tray via the magnets 1170, but the tray prohibits or limits the potential movement of the beacon due to high shear forces such as when a pusher contacts immovable objects or is dropped abruptly onto surfaces being plowed. Another possibility is the use of higher-strength magnets that employ a cam-type lock and unlock feature where the magnets must be manually disengaged before the beacon can be removed from the pusher surface.

Figure 10:
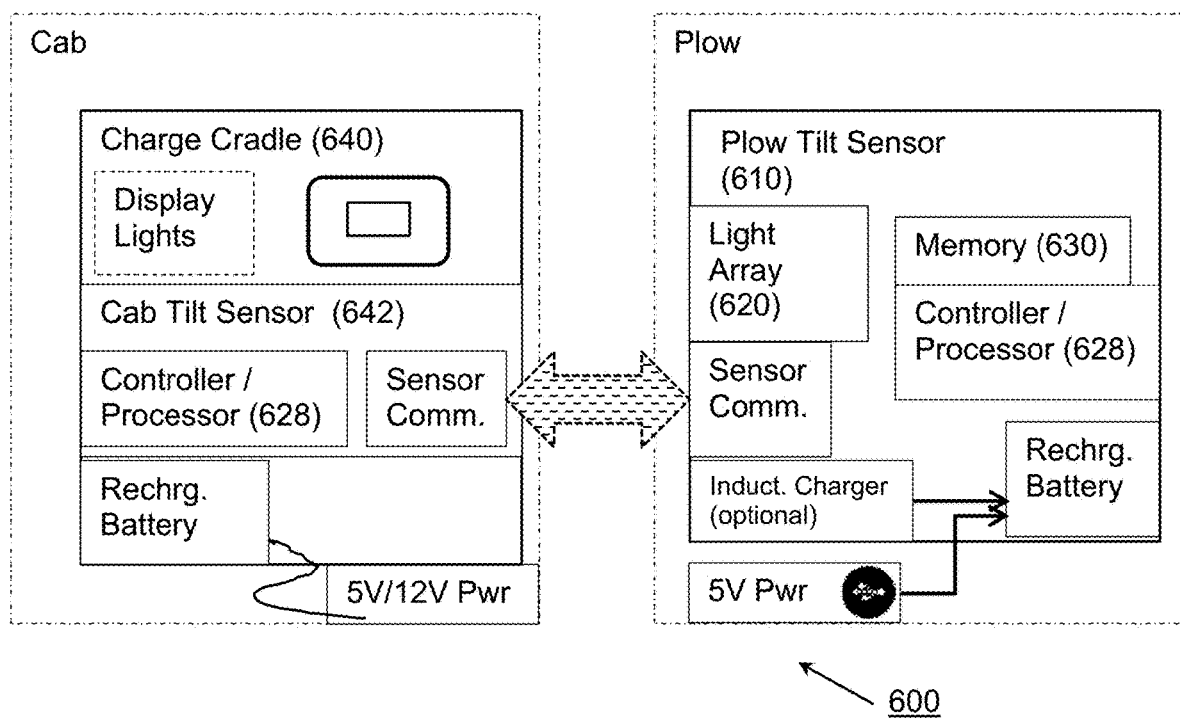
FIG. 10 is an illustration of an exemplary system including a charging or reference base for use in a vehicle cab.

As will be appreciated from the disclosure above relative to FIG. 10, the plow tilt sensing device 610 components and circuitry may be employed on the printed circuit board 1140. Moreover, in one embodiment of the beacon and reference units, the circuit board design is similar or common and the respective programming or features (beacon or reference) for the unit are enabled by the code or a selection switch on the board, thereby reducing the cost of different designs for each unit.

Referring briefly to FIG. 13, the assembly drawing for reference unit 640 shows that it includes several of the components of the beacon, and as described above the printed circuit board includes control circuitry as previously described. As noted above, the reference unit 640 is preferably used or mounted in a cab of the vehicle used with the plow or pusher. The reference unit cover may include one or more external switches (e.g., 1190) to control or place the units (beacon and/or reference) in a sleep, operational (active) or calibration mode. The reference unit also includes a charging port (USB 1182) and appropriate circuitry to use or charge the batteries of the reference unit off of various voltages USB 5V, conventional 12V (with an adaptor), etc. Thus, the reference unit can operate without power being connected.

The second cover 1210 may also include one or more external features, for example on surface 1220 that are intended to mate with matching features such as those found on the beacon. The intent of such features would be to allow the devices to be "stacked" or mated in order to place them into a charging configuration. For example, the beacon 50 has been described as including rechargeable batteries, but in order to provide charge, it may be necessary to connect the batteries via a charging port (such as the USB connector), or to provide an induction charging system such that when placed in proximity to the reference unit, the beacon batteries are charged using an inductive charging technology. As will be appreciated, the use of an induction charging system for recharging the batteries of the beacon, in combination with the elimination of the optional power switch by using the "wake-up" signal, would enable the beacon to be provided in a water-tight enclosure without risk of liquid penetration in a harsh snow plowing environment.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A tilt sensing and indicating device for attachment to a containment plow, including:
   a sensor, removably attached to the containment plow by a magnetic force, for detecting tilt, characterized as the angular orientation of the containment plow about a longitudinal axis of the containment plow, when the plow is in a home position, and when the plow is in a tilted orientation, said sensor producing a signal when a tilt angle of the plow deviates more than a pre-defined angle from the home position;
   at least one light, responsive to the signal produced by the sensor, wherein a state of the at least one light changes only in response to the sensor signal to indicate that the plow is tilted more than the pre-defined angle from the home position; and
   a housing in which said sensor and the at least one light are located.

2. The tilt sensing and indicating device according to claim 1, wherein the magnetic force is provided by a permanent magnet operatively associated with the housing.

3. The tilt sensing and indicating device according to claim 1, further including a rechargeable power source providing power to the sensor and the at least one light.

4. The tilt sensing and indicating device according to claim 3, wherein the rechargeable power source is rechargeable by a 12 VDC source.

5. The tilt sensing and indicating device according to claim 1, further including a switch to "home" the device after the device is applied to the containment plow.

6. The tilt sensing and indicating device according to claim 1 wherein the at least one light is viewable over an angle of at least 180-degrees about the device, thereby allowing application of the device to the plow in a plurality of different locations yet remaining visible to an operator using the containment plow.

7. A system for monitoring the tilt of a containment plow apparatus, comprising:
   a containment plow, including an upstanding central blade, having a longitudinal edge along a bottom side of said blade, and at least one side plate attached to and extending generally forward from the central blade near an end thereof;
   a plow tilt sensing device for monitoring a relative tilt angle of the plow, where the tilt angle is characterized as the angular orientation of the containment plow about a longitudinal axis of the containment plow, the plow tilt sensing device producing a signal representing the relative tilt angle of the containment plow, said plow tilt sensing device including a housing removably attached to the containment plow by a magnetic force;
   a visual indicator viewable through the housing of the plow tilt sensing device for providing a visual output in response to the relative tilt angle signal; and
   a processor for controlling the operation of said plow tilt sensing device, said processor operating in accordance with a program stored in memory associated with said processor, to periodically determine the relative tilt angle and to update the output signal and visual indicator in response thereto, where a representation of the output signal is provided by the visual indicator.

8. The system according to claim 7, wherein said tilt sensing device further includes a mechanical pendulum, the position of which is monitored to determine the relative tilt angle.

9. The system according to claim 8, wherein movement of the pendulum is dampened and the dampening of the pendulum is provided by at least one permanent magnet placed in proximity to the path of the pendulum.

10. The system according to claim 7, wherein said tilt sensing device further includes a mechanical pendulum, the position of which is monitored to determine the relative tilt angle, and said system further includes a vehicle tilt sensing device operatively associated with the vehicle.

11. The system according to claim 10, wherein the vehicle tilt sensing device communicates the vehicle tilt angle to the tilt sensing device, and the tilt sensing device sums the plow tilt angle and the vehicle tilt angle to produce the relative tilt angle.

12. The system according to claim 10, wherein the tilt sensing device and the vehicle tilt sensing device are in wireless communication with one another to communicate the tilt angle signal detected by at least one of the sensing devices to the other.

13. The system according to claim 7 wherein the visual indicator is viewable over an angle of at least 180-degrees about the plow tilt sensing device.

14. The system according to claim 7, wherein said tilt sensing device further includes an accelerometer, the output of which is processed by said processor to provide at least a tilt angle.

15. The system according to claim 7, wherein the relative tilt angle of the plow is determined as a combination of an actual tilt angle of the plow and an actual tilt angle of a vehicle to which the plow is attached.

16. The system according to claim 15, wherein the actual tilt angle of the plow is determined with a plow tilt sensor attached to the plow and the actual tilt angle of a vehicle to which the plow is attached is determined with a vehicle sensor attached to the vehicle, and where the plow tilt sensor and the vehicle tilt sensor are in communication to permit the exchange of the tilt angle from at least one to the other.

17. A tilt sensing and indicating device for attachment to a containment plow, including:
    a sensor, removably attached to the containment plow, for detecting the angular orientation of the containment plow about a longitudinal axis of the containment plow referred to as tilt angle, when the plow is in a home position, and when the plow is in a tilted orientation other than the home position, said sensor producing a signal when the tilt angle of the plow deviates more than a pre-defined angle from the home position; and
    at least one light, responsive to the signal produced by the sensor, wherein a state of the at least one light changes in response to the sensor signal to indicate that the plow is in a tilted orientation that deviates more than the pre-defined angle, said at least one light being visible through light-emitting portions on an exterior surface of the tilt sensing and indicating device.

18. The tilt sensing and indicating device according to claim 17, where said sensor is removably attached to the containment plow by a magnetic force.

19. The tilt sensing and indicating device according to claim 17, where the at least one light is viewable over an angle of at least 180-degrees.

20. The tilt sensing and indicating device according to claim 17, where said tilt sensing device further includes:
    a sensor element selected from the group consisting of: (i) a dampened mechanical pendulum, the position of which is monitored to determine the tilt angle, and (ii) an accelerometer, the output of which is processed to provide the tilt angle; and
    a processor for receiving output from said sensor element, processing the output from said sensor element and comparing the tilt angle to the pre-defined angle, and controlling the state of the at least one light.

* * * * *